United States Patent
Hatanaka et al.

(10) Patent No.: US 6,699,925 B2
(45) Date of Patent: Mar. 2, 2004

(54) FLAME-RETARDANT THERMOPLASTIC RESIN COMPOSITION AND MANUFACTURING METHOD THEREOF

(75) Inventors: Hidekatsu Hatanaka, Chiba Prefecture (JP); Koji Nakanishi, Chiba Prefecture (JP); Haruhiko Furukawa, Chiba Prefecture (JP); Koji Shiromoto, Chiba Prefecture (JP); Hiroshi Ueki, Chiba Prefecture (JP); Yoshitsugu Morita, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 324 days.

(21) Appl. No.: 09/938,251

(22) Filed: Aug. 23, 2001

(65) Prior Publication Data

US 2002/0045695 A1 Apr. 18, 2002

(30) Foreign Application Priority Data

Aug. 24, 2000 (JP) ........................ 2000-253790

(51) Int. Cl.$^7$ ............................ C08K 3/20; C08K 3/36; C08L 83/06
(52) U.S. Cl. ...................... 524/436; 524/492; 524/588; 525/100
(58) Field of Search ................. 524/436, 492, 524/588; 525/100

(56) References Cited

U.S. PATENT DOCUMENTS 5,100,958 A    3/1992    Fuhr et al. ................. 525/66
5,346,940 A  * 9/1994    Brassard et al. ............ 524/267
6,271,299 B1 * 8/2001    Alvarez et al. ............. 524/456

FOREIGN PATENT DOCUMENTS

| EP | 1 092 751 A1 | 4/2001 |
|---|---|---|
| JP | 61219398 | 9/1986 |
| JP | 5-339510 | 12/1993 |

* cited by examiner

Primary Examiner—Tae H. Yoon
(74) Attorney, Agent, or Firm—Alan Zombeck

(57) ABSTRACT

A flame-retardant thermoplastic resin composition comprising (A) 100 weight parts of a thermoplastic resin, (B) 10 to 300 weight parts of particulate metal hydroxide; (C) 0.01 to 50 weight parts of a branched polyorganosiloxane having alkoxy groups and described by average unit formula $R^1_a(R^2O)_b SiO_{(4-a-b)/2}$, where $R^1$ and $R^2$ are monovalent hydrocarbon groups selected from the group consisting of alkyl, alkenyl, and aryl groups, a is 0 or a positive number; b is a positive number; and a+b is a number from 0.75 to 2.5; (D) 0.01 to 50 weight parts of a branched polyorganosiloxane having silanol groups and described by average unit formula $R^3_a(HO)_b SiO_{(4-a-b)/2}$, where $R^3$ is a monovalent hydrocarbon group selected from the group consisting of alkyl, alkenyl, and aryl groups, a is 0 or a positive number, b is a positive number, and a+b is a number from 0.75 to 2.5; and (E) 0.01 to 10 weight parts of a condensation reaction promoting catalyst. The present invention further relates to a method for manufacturing the flame-retardant thermoplastic resin composition.

18 Claims, No Drawings

FLAME-RETARDANT THERMOPLASTIC RESIN COMPOSITION AND MANUFACTURING METHOD THEREOF

FIELD OF THE INVENTION

The present invention relates to a flame-retardant thermoplastic resin composition and a manufacturing method thereof, and more particularly to a flame-retardant thermoplastic resin composition having excellent flame retardance and mechanical characteristics and to a manufacturing method thereof.

BACKGROUND OF THE INVENTION

Admixing compounds having halogen atoms typified by chlorine atoms into polyolefin-based resins is used as a method for imparting flame retardance to polyethylene resins, ethylene-vinyl acetate copolymer resins, and other olefin-based resins. Polyolefin-based resin compositions containing compounds that have halogen atoms are disadvantageous, however, in that large amounts of black smoke are produced during burning and biologically toxic gases or metal-corroding gases are also produced. In conventional practice, adding metal hydroxides such as aluminum hydroxide powders or magnesium hydroxide powders to polyolefin-based resins has been suggested as a means of addressing these problems. A drawback of this method, however, is that large amounts of metal hydroxides must be added in order to render polyolefin-based resins flame-retardant, and this yields flame-retardant polyolefin-based resins that have inferior molding properties and mechanical strength.

According to another method, metal oxides, phosphoric acid esters, and branched polyorganosiloxanes containing alkoxy groups are added to styrene-based resins, polyolefin-based resins, and other thermoplastic resins to obtain flame-retardant thermoplastic resin compositions (JP Patent Application Publication(Kokai) Hei5-339510). However, a flame-retardant thermoplastic resin composition obtained by this method does not necessarily have adequate flame retardance and requires the use of phosphoric acid esters when the method is employed, creating concern that, for example, the soil will be contaminated by phosphorus compounds when the resin is discarded.

As a result of thoroughgoing research aimed at addressing these problems, the inventors perfected the present invention upon discovering that flame retardance can be markedly improved by admixing a condensation reaction promoting catalyst and two specific types of branched polyorganosiloxanes into a thermoplastic resin. Specifically, an object of the present invention is to provide a thermoplastic resin composition having excellent flame retardance and to provide a method for manufacturing this resin.

SUMMARY OF THE INVENTION

The present invention relates to a flame-retardant thermoplastic resin composition comprising (A) 100 weight parts of a thermoplastic resin, (B) 10 to 300 weight parts of particulate metal hydroxide; (C) 0.01 to 50 weight parts of a branched polyorganosiloxane having alkoxy groups and described by average unit formula $R^1_a(R^2O)_b SiO_{(4-a-b)/2}$, where $R^1$ and $R^2$ are monovalent hydrocarbon groups selected from the group consisting of alkyl, alkenyl, and aryl groups, a is 0 or a positive number; b is a positive number; and a+b is a number from 0.75 to 2.5; (D) 0.01 to 50 weight parts of a branched polyorganosiloxane having silanol groups and described by average unit formula $R^3_a(HO)_b SiO_{(4-a-b)/2}$, where $R^3$ is a monovalent hydrocarbon group selected from the group consisting of alkyl, alkenyl, and aryl groups, a is 0 or a positive number, b is a positive number, and a+b is a number from 0.75 to 2.5; and (E) 0.01 to 10 weight parts of a condensation reaction promoting catalyst. The present invention further relates to a method for manufacturing the above described flame-retardant thermoplastic resin composition.

DESCRIPTION OF THE INVENTION

The present invention relates to a flame-retardant thermoplastic resin composition comprising (A) 100 weight parts of a thermoplastic resin, (B) 10 to 300 weight parts of particulate metal hydroxide; (C) 0.01 to 50 weight parts of a branched polyorganosiloxane having alkoxy groups and described by average unit formula $R^1_a(R^2O)_b SiO_{(4-a-b)/2}$, where $R^1$ and $R^2$ are monovalent hydrocarbon groups selected from the group consisting of alkyl, alkenyl, and aryl groups, a is 0 or a positive number; b is a positive number; and a+b is a number from 0.75 to 2.5; (D) 0.01 to 50 weight parts of a branched polyorganosiloxane having silanol groups and described by average unit formula $R^3_a(HO)_b SiO_{(4-a-b)/2}$, where $R^3$ is a monovalent hydrocarbon group selected from the group consisting of alkyl, alkenyl, and aryl groups, a is 0 or a positive number, b is a positive number, and a +b is a number from 0.75 to 2.5; and (E) 0.01 to 10 weight parts of a condensation reaction promoting catalyst. The present invention further relates to a method for manufacturing the above described flame-retardant thermoplastic resin composition.

The thermoplastic resin of component (A) is not subject to any particular limitations as long as it is an organic resin having thermoplastic properties (properties that characterize reversible changes in which deformation is impeded, elasticity is displayed, and plasticity is absent at normal temperature, but appropriate heating brings out plasticity and makes the resin moldable, whereas reducing the temperature by cooling returns the resin to its plastic state with only minimal chemical changes in the molecular structure or the like). Specific examples include high-density polyethylene, medium-density polyethylene, low-density polyethylene, and copolymers of ethylene with propylene, butene-1, pentene-1, hexene-1,4-methylpentene-1, octene-1, decene-1, and other $C_3$–$C_{12}$ α-olefins; polypropylene and copolymers of propylene with ethylene, butene-1, pentene-1, hexene-1,4-methylpentene-1, octene-1, decene-1, and other $C_3$–$C_{12}$ α-olefins; polyolefin resins such as ethylene-propylene copolymers, ethylene-propylene-diene copolymers, copolymers of ethylene with vinyl-based monomers (vinyl acetate, ethyl acrylate, methacrylic acid, ethyl methacrylate, maleic acid, maleic anhydride, and the like), and copolymers obtained by modifying ethylene homopolymers or copolymers of ethylene and α-olefins with acrylic acid, maleic acid, or other unsaturated carboxylic acids or derivatives thereof; aromatic polycarbonate resins and copolymers thereof; polyphenylene ether resins and copolymers thereof; polyarylate resins; polyethylene terephthalate resins, polybutylene terephthalate resins and other aromatic polyester resins; polyamide resins; and polystyrene resins, polystyrene resins, ABS resins, AS resins, and other styrene-based resins. Of these, the polyolefin-based resins are preferred.

The particulate metal hydroxide of component (B) acts to provide the inventive composition with flame retardance. Component (B), which is a hydroxide of Group Ia, IIIa, or IVb metal of the Periodic Table, has a decomposition start temperature of 150 to 450° C. Specific examples include particulate magnesium hydroxide, particulate aluminum hydroxide, and products obtained by treating the surfaces of these compounds with silane coupling agents, titanium coupling agents, higher fatty acids, and other surface treatment agents. Of these, particulate magnesium hydroxide is preferred. The mean particle size should be between 0.01 and 30 μm, and preferably 0.05 and 10 μm, in order to provide the thermoplastic resin with adequate dispersibility and to prevent the molding properties of the resin composition from being adversely affected.

Component (B) should be added in an amount of 1 to 300 weight parts, and preferably 50 to 150 weight parts, per 100 weight parts of component (A), because adding too little of the component is ineffective for imparting flame retardance, while adding too much of component (B) has an adverse effect on mechanical strength.

By being used together with a branched polyorganosiloxane containing silanol groups (component (D)), the branched polyorganosiloxane containing alkoxy groups (component (C)) improves the flame retardance of component (A). Component (C) is a branched polyorganosiloxane described by average unit formula $R^1_a(R^2O)_b SiO_{(4-a-b)/2}$. In the formula, $R^1$ and $R^2$ are monovalent hydrocarbon groups selected from the group consisting of alkyl, alkenyl, and aryl groups. It is preferred that $R^1$ and $R^2$ be selected from the group consisting of $C_1$–$C_{12}$ alkyl groups and $C_6$–$C_{12}$ aryl groups. Specific examples of alkyl groups include methyl, ethyl, n-propyl, isopropyl, butyl, and hexyl groups, of which the methyl group is preferred. Specific examples of alkenyl groups include vinyl and hexenyl groups. Specific examples of aryl groups include phenyl, naphthyl, and tolyl groups, of which the phenyl group is preferred. Also in the formula, a is 0 or a positive number; b is a positive number; and a+b is a number from 0.75 to 2.5. The content of alkoxy groups in component (C) should be 1 to 50 wt %, and preferably 1 to 40 wt %. Component (C) may be in liquid or solid form. When component (C) is in solid form, the softening point thereof should be below the softening point of component (A), and preferably 300° C. or less, because of considerations related to dispersibility. When component (A) is a polyolefin-based resin, the softening point should preferably be 200° C. or less. The weight-average molecular weight of component (C) should be between 300 and 500,000, preferably between 500 and 100,000, and ideally between 500 and 10,000. As referred to herein, the weight-average molecular weight is determined by gel permeation chromatography.

Component (C) should be added in an amount of 0.01 to 5 weight parts, and preferably 0.1 to 30 weight parts, per 100 weight parts of component (A).

By being used together with a branched polyorganosiloxane containing alkoxy groups (component (C)), the branched polyorganosiloxane containing silanol groups (component (D)) improves the flame retardance of component (A). Component (D) is a branched polyorganosiloxane described by average unit formula $R^3_a(HO)_b SiO_{(4-a-b)/2}$. In the formula $R^3$ is a monovalent hydrocarbon group selected from the group consisting of alkyl, alkenyl, and aryl groups, a is 0 or a positive number, b is a positive number, and a+b is a number from 0.75 to 2.5. Preferred is when $R^3$ is selected from the group consisting of $C_1$–$C_{12}$ alkyl groups and $C_6$–$C_{12}$ aryl groups. Specific examples of alkyl groups include methyl, ethyl, n-propyl, isopropyl, butyl, and hexyl groups, of which the methyl group is preferred. Specific examples of alkenyl groups include vinyl and hexenyl groups. Specific examples of aryl groups include phenyl, naphthyl, and tolyl groups, of which the phenyl group is preferred.

The content of hydroxy groups in component (D) should be 1 to 50 wt %, and preferably 1 to 40 wt %. Component (D) may be in liquid or solid form. When component (D) is in solid form, the softening point thereof should be below the softening point of component (A), and preferably 300° C. or less, because of considerations related to dispersibility. When component (A) is a polyolefin-based resin, the softening point should preferably be 200° C. or less.

The weight-average-molecular weight of component (D) should be between 300 and 500,000, preferably between 500 and 100,000, and more preferably between 500 and 10,000.

Component (D) should be added in an amount of 0.01 to 50 weight parts, and preferably 0.1 to 30 weight parts, per 100 weight parts of component (A). The ratio of the number of moles of the silanol groups in component (D) and the number of moles of alkoxy groups in component (C) should preferably fall within a range of 1:0.8 to 1:1.2.

The condensation reaction promoting catalyst of component (E) is used to promote the condensation reaction (dealcoholation reaction) between components (C) and (D). Examples of component (E) include aluminum triethoxide, aluminum tri-n-propoxide, aluminum triisopropoxide, aluminumtri-sec-butoxide, and other substituted or unsubstituted aluminum alkoxides and partially hydrolyzed and condensed products thereof; diisopropoxy(acetylacetonate) aluminum, di-n-butoxy(acetylacetonate)aluminum, tris (acetylacetonate)aluminum, diisopropoxy(ethyl acetylacetonate)aluminum, di-n-butoxy(ethyl acetylacetonate)aluminum, n-butoxybutoxybis(ethyl acetylacetonate)aluminum, and other aluminum chelate compounds; dibutyltin dilaurate, dibutyltin diacetate, dibutyltin dioctoate, dibutyltin dilaurate, and other dibutyltin dicarboxylates; dibutyltin bisacetylacetonate, dibutyltin bisethyl acetoacetate, and other tin chelate compounds; titanium tetra-n-propoxide, titanium tetraisopropoxide, titanium tetra-n-butoxide, and other substituted or unsubstituted titanium alkoxides or partially hydrolyzed and condensed products thereof; titanium triisopropoxypropylene glycolate, titanium triisopropoxyoctylene glycol, titanium di-n-butoxybishexylene glycolate, and other titanium glycolates; diisopropoxybis(acetylacetonate)titanium, diisopropoxybis (ethylacetoacetate)titanium, and other titanium chelate compounds; zirconiumtetra-n-propoxide, zirconiumtetra-n-butoxide, and other zirconium alkoxide compounds and partially hydrolyzed and condensed products thereof; zirconium bisacetylacetonate, zirconium butoxyacetylacetonate, zirconium ethylacetoacetate, and other zirconium chelate compounds; zirconium octoate and other zirconium carboxylate; zinc octoate and other zinc carboxylates; and lead octoate and other lead carboxylates. The following are preferred because of considerations related to catalyst activity near the melting temperature of polyolefins: diisopropoxy(alkyl acetoacetate)aluminum, tris (acetylacetonate)aluminum, diisopropoxy(acetylacetonate) aluminum, aluminum triisopropoxide, zirconium ethylacetoacetate, zirconium octoate, zinc octoate, and lead octoate.

The following can be tentatively suggested as the reason that adding components (C), (D), and (E) in addition to components (A) and (B) dramatically improves the flame retardance of the inventive composition. Specifically, the alkoxy groups in component (C) and the silanol groups in component (D) condense and the molecular weight of the respective branched polyorganosiloxanes increases when components (C), (D), and (E) are mixed with component (A). It is also assumed that these branched polyorganosiloxanes form crosslinked structures. The carbide film formed on the surface of such crosslinked structures is believed to increase so-called char film strength, preventing decomposition gases from escaping from the thermoplastic resin, stopping combustion-induced heat emission, reducing the decomposition of the thermoplastic resin, minimizing dripping during combustion, and improving flame retardance.

The present resin composition comprises components (A) to (E). As long as the objects of the present invention are not compromised, it is also possible to employ the following additives commonly added to thermoplastic resin compositions: inorganic fillers such as calcium carbonate, talc, clay, mica, silica, and the like; antioxidants, lubricants, pigments, UV absorbers, heat/light stabilizers, dispersants, antistatic agents, and the like.

The inventive composition can be produced by the uniform mixing of components (A) to (E). A preferred option is to first mix components (A) and (B) under heating and then to admix components (C), (D), and (E). In the process, components (C), (D) and (E) should preferably be mixed with a silica powder having a BET specific surface of 50 $m^2/g$ or greater, and the resulting mixture added to a heated mixture of components (A) and (B). In this case, the silica powder should preferably be fine particulate silica with a BET specific surface of 50 $m^2/g$ or greater. The silica powder should preferably be added in an amount of 10 to 500 weight parts per 100 weight parts of each of components (C), (D), and (E). Examples of kneading apparatus for producing such a mixture include Henschel mixers, Super mixers, and Microna Mixers.

A two-roll mill, Banbury mixer, kneader/mixer, continuous kneader/extruder, or other apparatus commonly used for the production of thermoplastic resin compositions can be employed in order to produce the composition of the present invention.

The inventive composition can be fashioned into a molded film, molded sheet, molded board, molded pipe, or the like by extrusion molding, calendaring, injection molding, or another common method for molding thermoplastic resins. These moldings have excellent flame retardance, and this characteristic can be utilized to obtain electric wire coatings, cable coatings, materials for electric and electronic components, and the like.

WORKING EXAMPLES

The present invention will now be described through working examples. These examples are not intended to limit the claims herein. Tables 1 and 2 show the chemical structures of the branched polyorganosiloxanes (SHR1–SHR7) used in the working and comparative examples. In the formulas shown in Tables 1 and 2, Me designates a methyl group, Ph a phenyl group, D an $Me_2SiO_{2/2}$ unit, $D^{Ph2}$ a $Ph_2SiO_{2/2}$ unit, and $T^{Ph}$ a $PhSiO_{3/2}$ unit. The chemical structures of the branched polyorganosiloxane used herein were analyzed using nuclear magnetic resonance (NMR) spectra, and their weight-average molecular weight was measured by gel permeation chromatography (GPC). The weight-average molecular weight was converted to that of a standard polystyrene having a predetermined molecular weight. The following thermoplastic resins, particulate metal hydroxide, and condensation reaction promoting catalysts were used in the working and comparative examples.

Thermoplastic Resins
HDPE resin (high-density polyethylene) (Hi-Zex® 5305E from Mitsui Chemicals)
EEA resin (ethylene ethyl acrylate copolymer) (J-Rex® A1150 from Japan Polyolefins)
Particulate Metal Hydroxide
Magnesium hydroxide (Kisuma® 5A from Kyowa Chemical)
Condensation Reaction Promoting Catalysts
Diisopropoxy(alkyl acetoacetate)aluminum
Dibutyltin dilaurate
Lead octylate
Bismuth octylate

TABLE 1

| Branched polyorgano-siloxane | Average unit formula | Average molecular formula |
|---|---|---|
| SHR1 | $Me_{1.34}Ph_{0.33}(MeO)_{0.67}SiO_{0.83}$ | $D_{0.67}T^{Ph}_{0.33}(MeO_{1/2})_{0.67}$ |
| SHR2 | $Ph_{1.0}(MeO)_{1.3}SiO_{0.85}$ | $T^{Ph}_{1.0}(MeO_{1/2})_{1.3}$ |
| SHR3 | $Me_{1.0}(MeO)_{0.9}SiO_{1.05}$ | $T_{1.0}(MeO_{1/2})_{0.9}$ |
| SHR4 | $Me_{2.0}(HO)_{0.2}SiO_{0.9}$ | $D_{1.0}(HO_{1/2})_{0.2}$ |
| SHR5 | $Pr_{0.3}Ph_{0.7}(HO)_{0.5}SiO_{1.25}$ | $T^{Pr}_{0.3}T^{Ph}_{0.7}(HO_{1/2})_{0.5}$ |
| SHR6 | $Me_{1.03}(HO)_{0.19}SiO_{1.39}$ | $D_{0.03}T^{Ph}_{0.97}(HO_{1/2})_{0.19}$ |
| SHR7 | $Me_{2.0}(HO)_{0.005}SiO_{1.0}$ | $D_{1.0}(HO_{1/2})_{0.005}$ |

TABLE 2

| Branched polyorganosiloxane | Phenyl content (mol %) | Content of methoxy groups (wt %) | Content of hydroxy groups (wt %) | Weight-average molecular weight |
|---|---|---|---|---|
| SHR1 | 20 | 19.3 | 0.00 | 900 |
| SHR2 | 100 | 25.4 | 0.00 | 1300 |
| SHR3 | 0 | 31.8 | 0.00 | 650 |
| SHR4 | 0 | 0.0 | 4.5 | 770 |
| SHR5 | 70 | 0.0 | 6.9 | 1600 |
| SHR6 | 0 | 0.0 | 4.7 | 4900 |
| SHR7 | 0 | 0.0 | 0.11 | 29600 |

Working Examples 1–11 and Comparative Examples 1–4. Thermoplastic resins, particulate metal hydroxide, and the branched polyorganosiloxanes shown in Tables 1 and 2 (as SHR1–SHR7) were mixed in the ratios shown in Tables 3–5, yielding flame-retardant thermoplastic resin compositions. The mixing method was as follows. A Labo Plastomill (manufactured by Toyo Seiki Seisaku-sho) was heated to 220° C., the thermoplastic resins were first introduced and melted, and the particulate metal hydroxide was then introduced and kneaded until uniform dispersions were obtained. The branched polyorganosiloxanes containing alkoxy groups and the branched polyorganosiloxanes containing silanol groups were then sequentially added and mixed, the condensation reaction promoting catalysts were finally added, and the components were mixed for 5 minutes at 220° C., yielding thermoplastic resin compositions. The thermoplastic resin compositions thus obtained were injection-molded at a temperature of 220° C. The resulting moldings were evaluated for flame retardance and measured for mechanical strength. The flame retardance was evaluated by measuring the oxygen index in accordance with JIS-K7201 ("Burning Test Method for Plastics by Oxygen Index Technique"). The measurement results are shown in Tables 3 and 4.

Working Example 12. Branched polyorganosiloxane SHRI (30 parts), SHR7 (30 parts), dry-method silica with a BET specific surface of 200 $m^2/g$ (40 parts), and dibutyltin dilaurate (3 parts) were mixed for 10 minutes with the aid of a Super mixer (manufactured by Kawata Factory), and the system was allowed to stand for 24 hours at room temperature, yielding a white particulate mixture with an average particle diameter of 1-200 μm. A Labo Plastomill (manufactured by Toyo Seiki Seisaku-sho) was heated to 220° C., HDPE resin (high-density polyethylene; 100 parts) was first introduced and melted, particulate magnesium hydroxide (100 parts) was then introduced and kneaded in, and the previously obtained white powder (103 parts) was then admixed, yielding a thermoplastic resin composition. The thermoplastic resin composition was injection-molded at a temperature of 220° C., and the flame retardance of the resulting molding was measured. The oxygen index was found to be 37.

Comparative Example 5. A thermoplastic resin composition was obtained in the same manner as in Working Example 12 except that the dibutyltin dilaurate used in Working Example 12 was dispensed with. The resulting thermoplastic resin composition was injection-molded at a temperature of 220° C. The thermoplastic resin of the resulting molding was measured, and the oxygen index thereof was found to be 33.

TABLE 3

|  | Working Example 1 | Working Example 2 | Working Example 3 | Working Example 4 | Working Example 5 |
|---|---|---|---|---|---|
| Composition |  |  |  |  |  |
| HDPE resin (parts) | 100 | 100 | 100 | 100 | 100 |
| Magnesium hydroxide (parts) | 100 | 100 | 100 | 100 | 50 |
| Branched polyorganosiloxane containing alkoxy groups SHR1 (parts) | 5 | 5 | 5 | 5 | 3 |
| Branched polyorganosiloxane containing silanol groups SHR4 (parts) | 5 | 5 | 5 | 5 | 3 |
| Diisopropoxy(alkyl acetoacetate) aluminum (parts) | 0.5 |  |  |  | 0.3 |
| Lead octylate (parts) |  | 0.5 |  |  |  |
| Bismuth octylate (parts) |  |  | 0.5 |  |  |
| Zinc octylate (parts) |  |  |  | 0.5 |  |
| Characteristics |  |  |  |  |  |
| Oxygen index | 34 | 32 | 35 | 33 | 29 |
| Tensile strength (kgf/mm$^2$) | 1.6 | 1.6 | 1.6 | 1.6 | 1.6 |
| Elongation (%) | 90 | 66 | 55 | 76 | 120 |

TABLE 4

|  | Working Example 6 | Working Example 7 | Working Example 8 | Working Example 8 | Working Example 10 | Working Example 11 |
|---|---|---|---|---|---|---|
| Composition |  |  |  |  |  |  |
| HDPE resin (parts) | 100 |  | 100 | 100 | 100 | 100 |
| EEA resin (parts) |  | 100 |  |  |  |  |
| Magnesium hydroxide (parts) | 100 | 100 | 100 | 100 | 100 | 100 |
| Polyorganosiloxane containing alkoxy groups |  |  |  |  |  |  |
| SHR1 (parts) | 2 | 2 |  |  |  |  |
| SHR2 (parts) |  |  | 5 | 3 |  |  |
| SHR3 (parts) |  |  |  |  | 5 | 3 |
| Polyorganosiloxane containing silanol groups |  |  |  |  |  |  |
| SHR4 (parts) |  |  | 5 |  |  |  |
| SHR5 (parts) | 10 | 10 |  | 7 | 5 |  |
| SHR6 (parts) |  |  |  |  |  | 7 |
| Condensation reaction promoting catalyst |  |  |  |  |  |  |
| Diisopropoxy(alkyl acetoacetate) aluminum (parts) | 0.5 | 0.5 | 0.5 | 0.5 | 0.5 | 0.5 |
| Characteristics Oxygen index | 37 | 32 | 32 | 31 | 29 | 28 |

TABLE 5

|  | Comparative Example 1 | Comparative Example 2 | Comparative Example 3 | Comparative Example 4 |
|---|---|---|---|---|
| Composition |  |  |  |  |
| HDPE resin (parts) | 100 | 100 | 100 | 100 |
| Magnesium hydroxide (parts) | 100 | 100 | 100 | 100 |
| Polyorganosiloxane containing alkoxy groups |  |  |  |  |
| SHR1 (parts) | 5 |  | 5 |  |
| Polyorganosiloxane containing silanol groups |  |  |  |  |
| SHR4 (parts) | 5 |  |  | 5 |
| Condensation reaction promoting catalyst |  |  |  |  |
| Diisopropoxy(alkyl acetoacetate) aluminum (parts) |  |  | 0.5 | 0.5 |
| Characteristics |  |  |  |  |
| Oxygen index | 30 | 26 | 28 | 27 |
| Tensile strength (kgf/mm$^2$) | 1.8 | 1.7 | 1.6 | 1.6 |
| Elongation (%) | 28 | 65 | 35 | 40 |

We claim:

1. A flame-retardant thermoplastic resin composition comprising (A) 100 weight parts of a thermoplastic resin, (B) 10 to 300 weight parts of particulate metal hydroxide; (C) 0.01 to 50 weight parts of a branched polyorganosiloxane having alkoxy groups and described by average unit formula $R^1_a(R^2O)_b SiO_{(4-a-b)/2}$, where $R^1$ and $R^2$ are monovalent hydrocarbon groups selected from the group consisting of alkyl, alkenyl, and aryl groups, a is 0 or a positive number; b is a positive number; and a+b is a number from 0.75 to 2.5; (D) 0.01 to 50 weight parts of a branched polyorganosiloxane having silanol groups and described by average unit formula $R^3_a(HO)_b SiO_{(4-a-b)/2}$, where $R^3$ is a monovalent hydrocarbon group selected from the group consisting of alkyl, alkenyl, and aryl groups, a is 0 or a positive number, b is a positive number, and a+b is a number from 0.75 to 2.5; and (E) 0.01 to 10 weight parts of a condensation reaction promoting catalyst.

2. A flame-retardant thermoplastic resin composition according to claim 1, where component (A) is a polyolefin-based resin.

3. A flame-retardant thermoplastic resin composition according to claim 1, where component (B) is particulate magnesium hydroxide.

4. A flame-retardant thermoplastic resin composition according to claim 1, where the alkyl groups of component (C) are methyl groups, and the aryl groups are phenyl groups.

5. A flame-retardant thermoplastic resin composition according to claim 1, where $R^3$ is selected from the group consisting of methyl and phenyl.

6. A flame-retardant thermoplastic resin composition according to claim 1, where the alkoxy groups of component (C) are selected from the group consisting of methoxy and ethoxy.

7. A flame-retardant thermoplastic resin composition according to claim 1 further comprising (E) a silica powder having a BET specific surface area of 50 m$^2$/g or greater.

8. A flame-retardant thermoplastic resin composition according to claim 1, where component (B) has a mean particle size between 0.05 and 10 μm.

9. A flame-retardant thermoplastic resin composition according to claim 1 comprising 50 to 150 weight parts of component (B) per 100 weight parts of component (A).

10. A flame-retardant thermoplastic resin composition according to claim 1, where component (C) comprises 1 to 40 wt % alkoxy groups.

11. A flame-retardant thermoplastic resin composition according to claim 1, where component (C) has a weight-average molecular weight between 500 and 10,000.

12. A flame-retardant thermoplastic resin composition according to claim 1 comprising 0.1 to 30 weight parts of component (C) per 100 weight parts of component (A).

13. A flame-retardant thermoplastic resin composition according to claim 1, where component (D) comprises 1 to 40 wt % hydroxy groups.

14. A flame-retardant thermoplastic resin composition according to claim 1, where component (D) has a weight-average molecular weight between 500 and 10,000.

15. A flame-retardant thermoplastic resin composition according to claim 1 comprising 0.1 to 30 weight parts component (D) per 100 weight parts of component (A).

16. A flame-retardant thermoplastic resin composition according to claim 1, where mole ratio of number of moles of silanol groups in component (D) to number of moles of alkoxy groups in component (C) is within a range of 1:0.8 to 1:1.2.

17. A method for manufacturing a flame-retardant thermoplastic resin composition comprising (A) 100 weight parts of a thermoplastic resin, (B) 10 to 300 weight parts of particulate metal hydroxide; (C) 0.01 to 50 weight parts of a branched polyorganosiloxane having alkoxy groups and described by average unit formula $R^1_a(R^2O)_b SiO_{(4-a-b)/2}$, where $R^1$ and $R^2$ are monovalent hydrocarbon groups selected from the group consisting of alkyl, alkenyl, and aryl groups, a is 0 or a positive number; b is a positive number; and a+b is a number from 0.75 to 2.5; (D) 0.01 to 50 weight parts of a branched polyorganosiloxane having silanol groups and described by average unit formula $R^3_a(HO)_b SiO_{(4-a-b)/2}$, where $R^3$ is a monovalent hydrocarbon group selected from the group consisting of alkyl, alkenyl, and aryl groups, a is 0 or a positive number, b is a positive number, and a+b is a number from 0.75 to 2.5; and (E) 0.01 to 10 weight parts of a condensation reaction promoting catalyst comprising the steps of heating and mixing components (A) and (B) and then adding components (C), (D), and (E) and mixing.

18. A method as defined in claim 17, further comprising mixing components (C), (D), and (E) with a silica powder having a BET specific surface of 50 $m^2/g$ or greater, and adding the resulting mixture the heated mixture of components (A) and (B).

* * * * *